(12) United States Patent
Kauffeldt et al.

(10) Patent No.: US 7,950,323 B2
(45) Date of Patent: May 31, 2011

(54) SHIFTING DEVICE FOR SHIFTING A MOTOR VEHICLE GEAR BOX

(75) Inventors: Rudolf Kauffeldt, Bodolz (DE); Hans-Joachim Martin, Kressbronn (DE); Gerhard Gumpoltsberger, Friedrichshafen (DE); Michael Ebenhoch, Tettnang (DE); Wolfgang Rieger, Friedrichshafen (DE); Michael Drabek, Brandenburg (DE); Stefan Csajagi, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 357 days.

(21) Appl. No.: 12/093,972

(22) PCT Filed: Feb. 2, 2007

(86) PCT No.: PCT/EP2007/051032
§ 371 (c)(1),
(2), (4) Date: May 16, 2008

(87) PCT Pub. No.: WO2007/093509
PCT Pub. Date: Aug. 23, 2007

(65) Prior Publication Data
US 2008/0296112 A1    Dec. 4, 2008

(30) Foreign Application Priority Data

Feb. 15, 2006    (DE) .......................... 10 2006 006 868

(51) Int. Cl.
*F01B 9/00* (2006.01)
(52) U.S. Cl. ........................................................ 92/140

(58) Field of Classification Search ................... 92/129, 92/140, 187, 128; 74/473.11
See application file for complete search history.

(56) References Cited

U.S. PATENT DOCUMENTS

| 4,125,059 | A  | * | 11/1978 | Tuji .................................. 92/129 |
| 6,612,196 | B1 |   | 9/2003  | Petzold |
| 6,854,353 | B2 | * | 2/2005  | Koerber ...................... 74/473.11 |
| 6,892,598 | B2 | * | 5/2005  | Mepham et al. ............ 74/473.11 |
| 6,981,429 | B2 | * | 1/2006  | Maisch et al. .................. 92/129 |

FOREIGN PATENT DOCUMENTS

| DE | 2 223 881     | 12/1973 |
| DE | 25 10 392     | 9/1976  |
| DE | 32 13 757 A1  | 1/1983  |
| DE | 197 56 639 A1 | 6/1999  |
| EP | 0 085 498 A1  | 8/1983  |
| EP | 0 487 861 A1  | 6/1992  |
| EP | 0 541 035 A1  | 5/1993  |
| EP | 1 398 544 A2  | 3/2004  |
| JP | 59089856      | 5/1984  |
| WO | WO-03/085290 A1 | 10/2003 |

* cited by examiner

*Primary Examiner* — Michael Leslie
(74) *Attorney, Agent, or Firm* — Davis & Bujold, P.L.L.C.

(57) ABSTRACT

A shifting device (1) for shifting a motor vehicle transmission with a shift selector shaft on which a plurality of shift elements (2) such as shift forks or shift rockers (3) are arranged and can be displaced to carry out a shifting operation. The shifting device (1) includes one hydraulic shift cylinder (5, 11, 18, 25), that can be actuated from both sides, with a piston (9, 15, 16, 19, 26) that can be displaced within a cylinder housing (6) and which is actively connected with a shift element (2) to be actuated. To simplify a shifting device (1) of this type, the piston (9, 15, 16, 19, 26) has a piston rod (10, 17, 23, 29) that follows the movement of the piston (9, 15, 16, 19, 26) and can be connected directly to the shift element (2) in a detachable manner.

13 Claims, 2 Drawing Sheets

SHIFTING DEVICE FOR SHIFTING A MOTOR VEHICLE GEAR BOX

This application is a national stage completion of PCT/EP2007/051032 filed Feb. 2, 2007, which claims priority from German Application Serial No. 10 2006 006 868.8 filed Feb. 15, 2006.

FIELD OF THE INVENTION

The invention concerns a shifting device for shifting a motor vehicle transmission.

BACKGROUND OF THE INVENTION

To shift a transmission, a shifting device is provided inside the transmission in a vehicle to help engage and disengage individual gears. For this purpose, components of the shifting device can be actuated manually by the driver of the vehicle or shift elements or actuators that can be operated by auxiliary means, for example hydraulic fluid, are provided and these act upon the components of the shifting device, as necessary, to shift the gears.

From EP 0 541 035 B1, a shifting device for multiple-gear, range-change transmissions is known, which comprises valves and shift cylinders in which there are pistons actuated by a control fluid. Shift rods are attached to the shift cylinders, and act, via shift elements, on components of the transmission to form a torque-transmitting connection. A shift rod actuates the components associated with the speed range.

In this case, it is disadvantageous that the shift rods have substantial mass which contributes to the overall mass of the transmission with adverse effect and which has to be accelerated and braked each time a shifting operation is carried out.

From DE 197 56 639 A1, a shift device is known in which shift cylinders accommodating pistons displaced by a fluid are provided. These are integrally connected with shift elements, namely shift forks. The piston connected to a shift fork can be moved axially in two directions along a guide rail with which the two-part cylinder housing is solidly connected, whereby the shift element too is moved.

In the shifting device known from DE 197 56 639 A1, it is advantageous that, owing to its construction as a compact unit, connecting elements between the shift elements consisting of shift forks or shift rockers and the shift cylinders or shift pistons are not needed so that the reaction times, between the command that triggers a gearshift and the movement of the shift elements that bring it about, can be made considerably shorter due to the absence of the heavy shift rods that would otherwise have to be moved.

A disadvantage of such a shifting device, however, is the integrated design of the shift piston and shift element which, in particular, makes maintenance and replacement of the shifting device more difficult. Likewise, integration or adaptation of such an arrangement in an existing transmission is hardly possible. In some types of transmissions, it can also be disadvantageous for such an arrangement that the piston can only move axially along its guide rail. With a design of that type, swiveling or tilting of a shift element, which is desirable in some circumstances, is not possible.

A further problem of the known systems is that the shift times are relatively long, which can be attributed to the long hydraulic line connections to the shift elements. In addition, such lines often have to be passed through restricted spaces and bent through quite sharp angles and this results in comparatively high line resistances and hence long shift times.

Against this background, the purpose of the present invention is to provide a shifting device of the type outlined, which enables short shift times, which is of compact structure and which is repair- and maintenance-friendly.

SUMMARY OF THE INVENTION

The invention is based on recognition of the fact that the stated objective can be achieved with a 2-way shift cylinder of simple construction, which is connected to the shift element, in particular a shift fork or a shift rocker, in a detachable manner.

Accordingly, the starting point for the invention is a shifting device for shifting a motor vehicle transmission with a shift selector shaft on which a plurality of shift elements, in particular shift forks or shift rockers, are arranged and can move in order to carry out a shift operation. The shifting device comprises at least one hydraulic shift cylinder that can be actuated from both sides with a piston that can be displaced by fluid within a cylinder housing and which is in active connection with a shift element to be actuated. To achieve the stated objective, the invention also provides that the piston has a piston rod which can be connected directly to the shift element in a detachable manner.

This arrangement provides a shifting device which is simple to construct, has compact overall dimensions and is also simple to assemble and to maintain. Thus, to assemble the shifting device, it is only necessary to fit a shift rocker in the shift cylinder and correspondingly to remove it again when dismantling. Since the cylinder or cylinder piston is connected directly to the shift fork or shift rocker, the shift travel paths are very short and this leads to small moving masses and, along with very short line lengths for the fluid, to very short shift times.

In a practical further embodiment of the invention, it can be provided that the shift cylinder is made as a horizontally acting shift cylinder that can be actuated from both sides and, in addition, that the shift cylinder has a dual piston whose piston faces can be acted upon by fluid under pressure and whose two component pistons are connected by a piston rod which is connected to the shift element.

In a further embodiment of the invention alternative to the above, it can be provided that the shift cylinder is made as a horizontally acting, stepped shift cylinder that can be actuated from both sides. Furthermore, the shift cylinder can have a piston whose faces can be acted upon by fluid under pressure and whose piston rod end, located outside the cylinder housing, is connected to the shift element.

Another conceivable alternative embodiment is to make the shift cylinder as a vertically acting shift cylinder that can be actuated from both sides. This design is further developed in that the shift cylinder has a piston whose faces can be acted upon by fluid under pressure and whose piston rod end, located outside the cylinder housing, is connected to the shift element.

In addition, according to another alternative embodiment, the shift cylinder can be made as a vertically acting, stepped shift cylinder that can be actuated from both sides. It is further provided that the shift cylinder has a piston whose faces can be acted upon by the fluid under pressure and whose piston rod end, located outside the cylinder housing, is connected to the shift element.

Depending on the design of the shift cylinder and the shift element and its mounting, it can be that, as necessary, a movement of the piston rod brings about tilting movement or axial displacement of the shift element.

In a particularly useful further embodiment of the invention, it can be provided that the shift cylinder is integrated in a duct plate of the transmission or, alternatively, that the shift cylinder with its cylinder housing is connected, in particular bolted, to a hydraulic shift unit of the transmission.

Likewise, however, it is also possible for the shift cylinder with its cylinder housing to be connected, in particular bolted, to a transmission housing of the transmission.

BRIEF DESCRIPTION OF THE DRAWINGS

The invention will now be described, by way of example, with reference to the accompanying drawings in which.

DETAILED DESCRIPTION OF THE INVENTION

Figure 1:
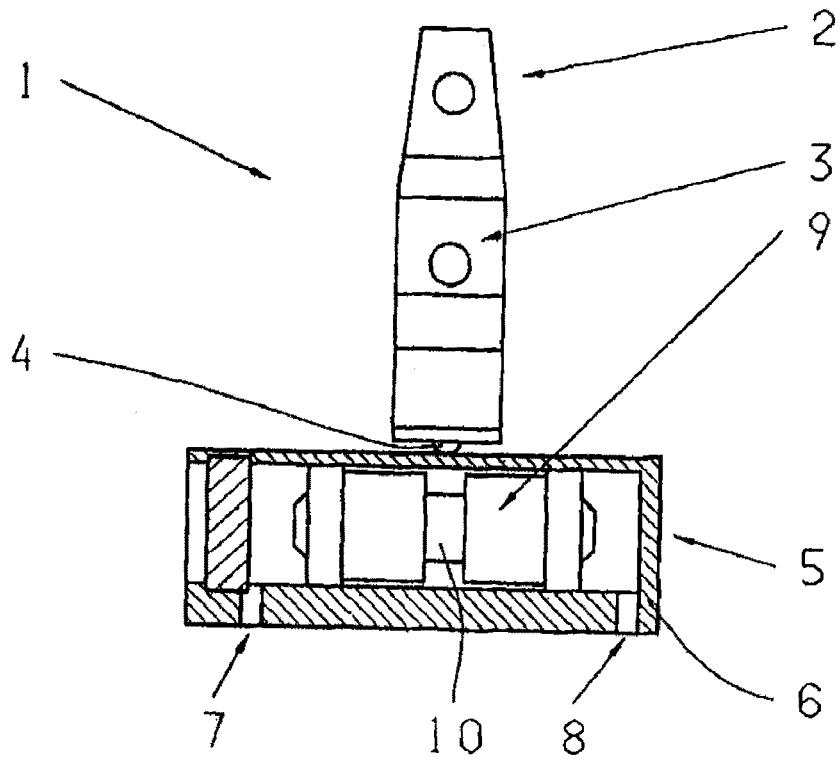
FIG. 1 is a schematic representation, viewed from the side, of a first embodiment of a shifting device made, according to the invention.

FIG. 1 is a schematic representation of a shifting device 1 for shifting a motor vehicle transmission (not shown), with a shift selector shaft (also not shown) on which are arranged a plurality of shift elements 2. One shift element 2 is in the form of a shift rocker 3 for carrying out a shift operation, shown in FIG. 1.

A free end 4 of the shift rocker 3 is connected in a detachable manner to a shift cylinder 5. The shift cylinder 5 has a cylinder housing 6 with two pressure lines 7 and 8 through which a fluid or hydraulic liquid can be delivered into the cylinder housing 6. Depending on which of the two pressure lines 7, 8 is used to deliver the hydraulic liquid to the cylinder housing 6, a piston 9 is displaced to the left or to the right. The piston 9 has a piston rod 10 which is connected approximately in the middle to the free end 4 of the shift element 2 made as a shift rocker 3.

Figure 2:
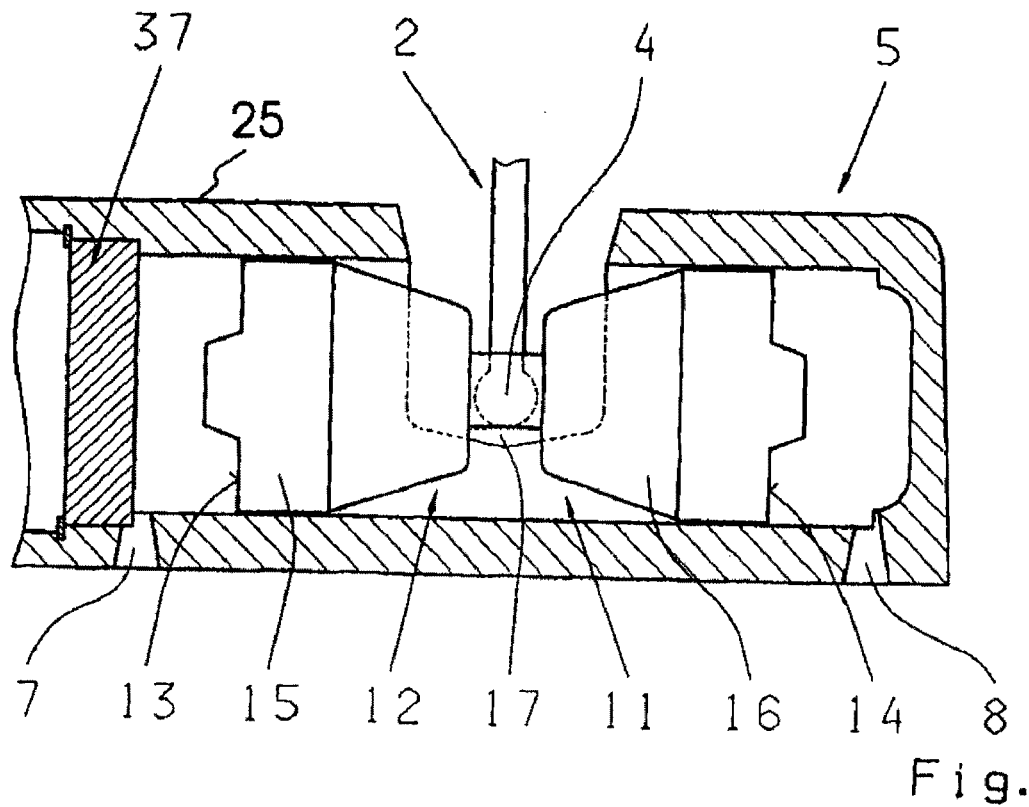
FIG. 2 is a detail from FIG. 1, shown in longitudinal section.

The shift cylinder 5 of the first embodiment, shown in FIGS. 1 and 2, is made as a horizontally acting, shift cylinder 11 that can be actuated from both sides which, as can be seen in FIG. 2, comprises a dual piston 12 whose piston faces 13, 14 can be acted upon by the fluid passed into the cylinder housing 6 through the pressure lines 7, 8. The dual piston 12 consists of two component pistons 15 and 16 connected to one another by a piston rod 17. The piston rod 17 is also connected in a detachable manner to the free end 4 of the shift element 2.

If fluid flows through line 7 and acts to exert pressure on the piston face 13 of the piston 15, the dual piston 12 is displaced to the right and the free end 4 of the shift element 2 as well is moved to the right. Depending on the mounting of the shift element 2, this will then undergo a lateral displacement or a tilting movement and, by virtue of known action upon coupling links, will bring about a corresponding shift operation of a selected gear of the transmission.

Figure 3:
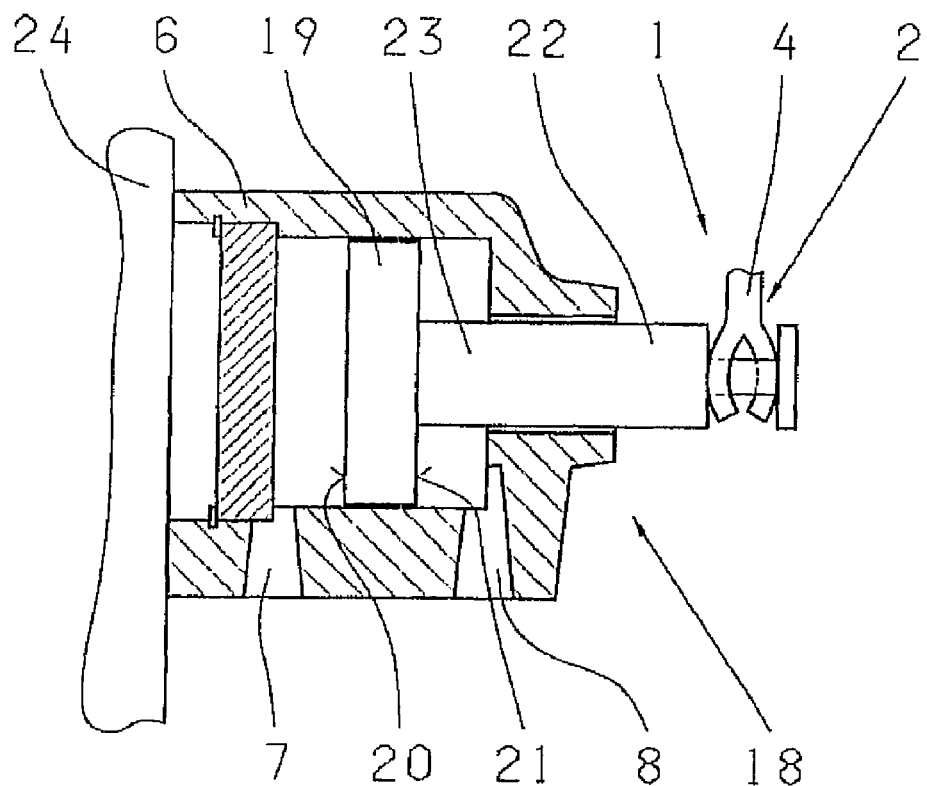
FIG. 3 is a second embodiment of a shifting device, shown in longitudinal section, according to the invention.

FIG. 3 shows a second embodiment of shifting device 1 represented in longitudinal section. This shifting device 1 corresponds in principle to the shifting device 1 shown in FIG. 1, but the shift cylinder 5 is now made as a horizontally acting, stepped shift cylinder 18 that can be actuated from both sides. In contrast to the shift cylinder 11 in FIGS. 1 and 2, the shift cylinder 18 has only one piston 19, whose piston faces 20, 21 can be acted upon by the fluid and whose piston rod end 22 of a piston rod 23, located outside the cylinder housing 6, is connected to the free end 4 of the shift element 2.

The cylinder housing 6 of the shift cylinder 18 is, in addition, connected to a transmission housing wall 24 or to the housing of a hydraulic shift mechanism.

Figure 4:
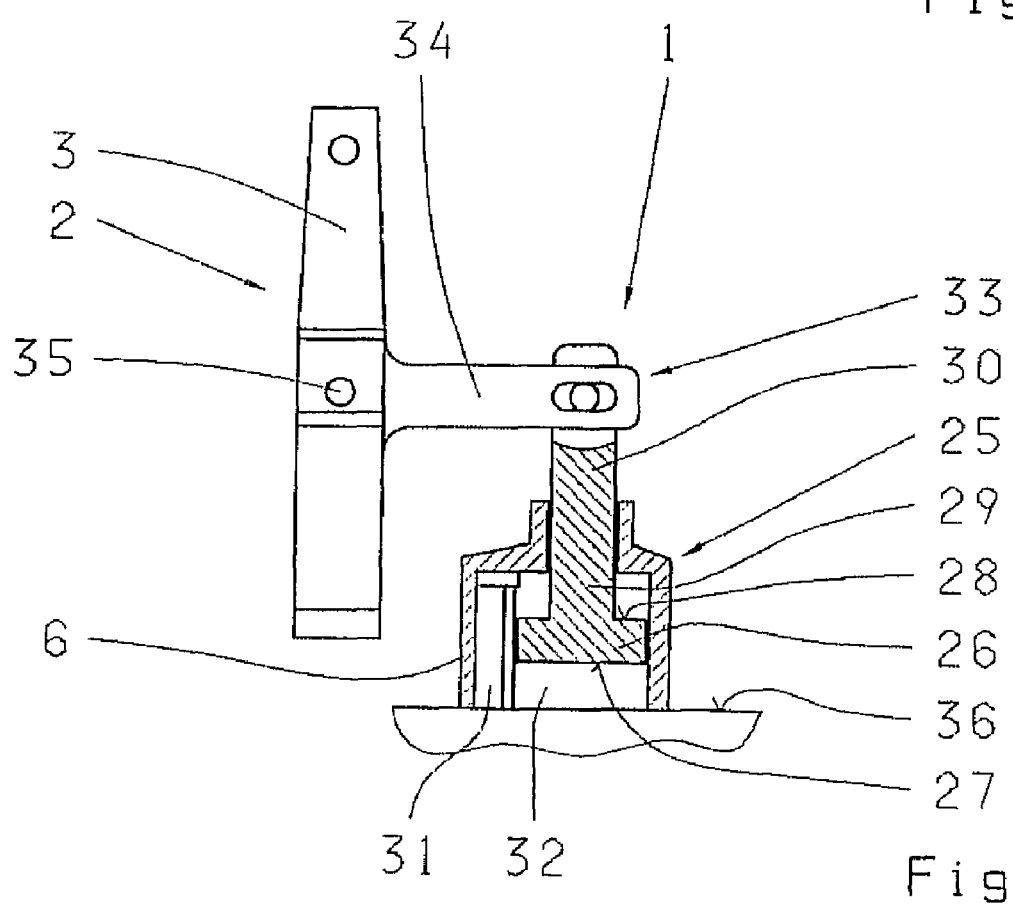
FIG. 4 is a third embodiment of a shifting device, shown in longitudinal section, according to the invention.

FIG. 4 shows a third embodiment of the shift element 1 in which the shift cylinder 5 is this time made as a vertically acting, stepped shift cylinder 25 that can be actuated from both sides and which corresponds largely to the shift cylinder 18 shown in FIG. 2. Accordingly, the shift cylinder 25 has a piston 26 with two faces 27 and 28 and with a piston rod 29, whose piston rod end 30, located outside the cylinder housing 6, is connected to the free end 4 of the shift element 2. In contrast to the example embodiment shown in FIG. 2, the shift cylinder 25 has vertical pressure lines 31 and 32 through which fluid can flow into the shift cylinder 25 and act to exert pressure on the faces 27 and 28. The orientation of the cylinder housing 6, the piston rod 29 and the piston rod end 30 is also vertical.

The shift element 2, shown in FIG. 4 in the form of a shift rocker 3 has a free end 33 in the form of a web 34 extending at a right-angle from the shift rocker 3. The free end is connected to the piston rod end 30. If the piston rod end 30 is raised by the fluid flowing in through the pressure line 32, the shift rocker 3 is tilted or swiveled about a pivot axis 35 and this results in shifting of the corresponding transmission element.

The cylinder housing 6 of the shift cylinder 25 is bolted to a shift unit 36 (only indicated). It can also be, however, that the shift cylinder 25 is integrated in a duct plate 37, shown indicatively in FIG. 2. Correspondingly, in all the illustrated embodiments, the shift element can either be connected to or integrated in either the transmission housing wall 24 or the duct plate 37 or the control unit 36.

The embodiment of a vertically acting, shift cylinder 25 shown in FIG. 4, can be varied in that a vertically acting, shift cylinder in the form of a dual piston cylinder, similar to the form shown in FIGS. 1 and 2, can be used and the pressure lines would then be adapted to the dual piston design. The vertically acting, dual piston, shift cylinder would correspondingly be arranged higher up, which might be advantageous depending on the internal topography of the transmission.

| Reference numerals | |
| --- | --- |
| 1 | shifting device |
| 2 | shift element |
| 3 | shift rocker |
| 4 | free end of 2 or 3 |
| 5 | shift cylinder |
| 6 | cylinder housing |
| 7 | pressure line |
| 8 | pressure line |
| 9 | piston |
| 10 | piston rod |
| 11 | shift cylinder |
| 12 | dual piston |
| 13 | piston face |
| 14 | piston face |
| 15 | piston |
| 16 | piston |
| 17 | piston rod |
| 18 | shift cylinder |
| 19 | piston |
| 20 | piston face |
| 21 | piston face |
| 22 | piston rod end |

-continued

| Reference numerals | |
|---|---|
| 23 | piston rod |
| 24 | transmission housing wall |
| 25 | shift cylinder |
| 26 | piston |
| 27 | piston face |
| 28 | piston face |
| 29 | piston rod |
| 30 | piston rod end |
| 31 | pressure line |
| 32 | pressure line |
| 33 | free end of the web 34 |
| 34 | web |
| 35 | pivot axis |
| 36 | shift unit |
| 37 | duct plate |

The invention claimed is:

1. A shifting device (1) of a motor vehicle transmission, the shifting device (1) comprising:
at least one shift rocker (3) for actuating a shift operation of the transmission, and each at least one shift rocker (3) being fixedly supported so as to only being pivotable about a respective tilt axis
at least one hydraulic shift cylinder (5, 11, 18, 25) having a piston (9, 15, 16, 19, 26) that is axially displaced in opposed first and second axial directions by a fluid within a cylinder housing (6), and
a free end (4) of the at least one shift rocker (3) being connected to a piston rod (10, 17, 23, 29), and the piston rod (10, 17, 23, 29) being connected with and following axial movement of the piston (9, 15, 16, 19, 26),
the free end (4) of being detachably connected with the piston rod (10, 17, 23, 29) to facilitate both assembly and disassembly of the shifting device (1),
the free end (4) of extending from the piston rod (10, 17, 23, 29) with the free end (4) being pivotably connected with the piston rod (10, 17, 23, 29) and a second end thereof being connected with the shift rocker (3) such that axial displacement of the piston (9, 15, 16, 19, 26), in either the first axial direction or the second direction, correspondingly pivots the shift rocker (3) to facilitate shifting of the transmission.

2. The shifting device according to claim 1, wherein the shift cylinder (25) is a vertically acting shift cylinder (11) which is actuated from both vertically above and vertically below.

3. The shifting device according to claim 2, wherein the shift cylinder (5) has a piston whose faces are acted upon by the fluid and whose piston rod end, located outside the cylinder housing (6), is connected to the shift rocker (3).

4. The shifting device according to claim 2, wherein the shift cylinder is a vertically acting, stepped shift cylinder (25) that is actuated from both vertically above and vertically below.

5. The shifting device according to claim 4, wherein the shift cylinder (25) has a piston (26) whose faces (27, 28) are acted upon by the fluid, and whose piston rod end (30) of the piston rod (29), located outside the cylinder housing (6), is connected to the shift rocker (3).

6. The shifting device according to claim 1, wherein displacement of the piston rod (29) of the shift cylinder (25) brings about a tilting movement of the shift rocker (3).

7. The shifting device according to claim 1, wherein the shift cylinder (25) is integrated in a duct plate (37) of the transmission.

8. The shifting device according to claim 1, wherein the shift cylinder (5, 11, 18, 25) is connected by the cylinder housing (6) to a shift unit (36) of the transmission, and the cylinder housing (6) is bolted to the shift unit (36).

9. A shifting device (1) of a motor vehicle transmission, the shifting device (1) including at least one shift rocker (3) for actuating a shift operation of the transmission, and each of the at least one shift rockers (3) being fixedly supported so as to only being pivotable about a respective tilt axis and the shifting device (1) comprising:
a hydraulic shift cylinder (5, 11, 18, 25) having a first side and a second side, a first pressure line (7) being coupled to the first side to supply fluid to and from the first side of the shift cylinder (5, 11, 18, 25), and a second pressure line (8) being coupled to the second side to supply fluid to and from the second side of the shift cylinder (5, 11, 18, 25);
a piston (9, 15, 16, 19, 26), having a piston rod (10, 17, 23, 29) fixed thereto, being slidably located within the shift cylinder (5, 11, 18, 25) such that,
when the fluid flows to the first side of the shift cylinder (5, 11, 18, 25), the piston (9, 15, 16, 19, 26) is axially displaced within the shift cylinder (5, 11, 18, 25) in a first direction, and
when the fluid flows to the second side of the shift cylinder (5, 11, 18, 25), the piston (9, 15, 16, 19, 26) is axially displaced within the shift cylinder (5, 11, 18, 25) in an opposite second direction; and
a free end (4) of the at least one shift rocker (3) extending from the piston rod (10, 17, 23, 29) with a first end being pivotably connected with the piston rod (10, 17, 23, 29) and a second end being engaged with the shift rocker (3) so that axial displacement of the piston (9, 15, 16, 19, 26), in either the first direction or the second direction, correspondingly pivots the shift rocker (3) to facilitate a shifting actuation motion of the the at least one shift rocker (3) and induce a shift operation of the transmission.

10. The shifting device according to claim 9, wherein the shifting device includes a plurality of shift rockers (3).

11. The shifting device according to claim 9, wherein the piston rod (10, 17, 23, 29) extends axially through a cylinder housing (6) on the second side of the shift cylinder (5, 11, 18, 25) to communicate with the shift rocker (3).

12. The shifting device according to claim 9, wherein the piston (9, 15, 16, 19, 26) includes a first piston head (15) and a second piston head (16) with the piston rod (10, 17, 23, 29) axially extending therebetween to couple the first piston head (15) and the second piston head (16), and the shift rocker (3) communicates with the piston rod (10, 17, 23, 29) and radially extends from the piston rod (10, 17, 23, 29) and the shift cylinder (5, 11, 18, 25) through a cylinder housing (6).

13. A shifting device (1) of a motor vehicle transmission, the shifting device (1) comprising:
a plurality of shift rockers (3) for actuating a shift operation of the transmission; and each of the at least one shift rockers (3) being fixedly supported so as to only being pivotable about a respective tilt axis
at least one hydraulic shift cylinder (5, 11, 18, 25) having a piston (9, 15, 16, 19, 26) that is axially displaced along a piston axis in opposed first and second axial directions by a fluid within a cylinder housing (6);
a free end (4) of each shift rocker (3) being actuated by a piston rod (10, 17, 23, 29), and the piston rod (10, 17, 23, 29) being connected with and following axial movement of the piston (9, 15, 16, 19, 26), the free end (4) being detachably connected with the piston rod (10, 17, 23, 29) to facilitate assembly and disassembly of the shifting device (1), the free end (4) extending from the piston rod (10, 17, 23, 29) with a first end thereof being pivotably connected with the piston rod (10, 17, 23, 29) and a second end thereof being engaged with the shift rocker (3) such that axial displacement of the piston (9, 15, 16, 19, 26), in either the first axial direction or the second direction, correspondingly pivots the shift rocker (3) relative to the piston pivot axis so as to facilitate shifting of the transmission.

* * * * *